United States Patent [19]

Agano et al.

[11] Patent Number: 4,977,322

[45] Date of Patent: Dec. 11, 1990

[54] METHOD AND APPARATUS FOR MINIMIZING IMAGE SIGNAL NOISE, AND RADIATION IMAGE READ-OUT METHOD AND APPARATUS

[75] Inventors: Toshitaka Agano; Shigeru Saotome, both of Kanagawa, Japan

[73] Assignee: Fuji Photo Film co., Ltd., Kanagawa, Japan

[21] Appl. No.: 31,740

[22] Filed: Mar. 30, 1987

[30] Foreign Application Priority Data

Mar. 28, 1986 [JP] Japan .................................. 61-70595
Jun. 26, 1986 [JP] Japan ................................ 61-150226

[51] Int. Cl.$^5$ ............................................ G01N 23/04
[52] U.S. Cl. ............................ 250/327.2; 250/484.1
[58] Field of Search ................ 250/327.2 G, 327.2 F, 250/484.1 B; 307/520, 521, 510; 358/447, 443, 446

[56] References Cited

U.S. PATENT DOCUMENTS 3,696,252 10/1972 Chapman ............................ 307/520
4,322,641 3/1982 Packard ............................. 307/521
4,896,222 1/1990 Fukai ................................. 358/447

Primary Examiner—Janice A. Howell
Assistant Examiner—Richard Hanig
Attorney, Agent, or Firm—Sughrue, Mion, Zinn, Macpeak & Seas

[57] ABSTRACT

A method of minimizing image signal noise comprises the steps of feeding an image representing an image to a high-frequency component decreasing device for arbitrarily decreasing a high-frequency component, detecting the level of the image signal, and decreasing the high-frequency component of the image signal by the high-frequency component decreasing device in accordance with a decrease in the level of the image signal. A radiation image read-out method for exposing a stimulable phosphor sheet carrying a radiation image stored thereon to stimulating rays which cause the stimulable phosphor sheet to emit light in proportion to the stored radiation energy, and photoelectrically detecting the emitted light to obtain an image signal representing the radiation image comprises the steps of detecting the level of radiation energy stored on the stimulable phosphor sheet, and decreasing the high-frequency component of the image signal by the high-frequency component decreasing device in accordance with a decrease in the level of the stored radiation energy.

13 Claims, 5 Drawing Sheets

METHOD AND APPARATUS FOR MINIMIZING IMAGE SIGNAL NOISE, AND RADIATION IMAGE READ-OUT METHOD AND APPARATUS

BACKGROUND OF THE INVENTION

1. Field of the Invention

This invention relates to a method of minimizing image signal noise, and an apparatus for carrying out the method. This invention also relates to a radiation image read-out method for reading out an image stored on a stimulable phosphor sheet by exposing the stimulable phosphor sheet to stimulating rays which cause the stimulable phosphor sheet to emit light in proportion to the stored radiation energy, and photoelectrically detecting the emitted light, and an apparatus for carrying out the radiation image read-out method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to an electric image signal by a photodector, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device.

Therefore, in the aforesaid radiation image recording and reproducing system, high sensitivity image recording may be conducted by adjusting the radiation dose to a very low value. In the case of general radiation image recording, the amount of exposure to the radiation varies locally on a single stimulable phosphor sheet in accordance with differences in radiation absorptivity among various portions of an object. When the radiation dose is adjusted to be very low as mentioned above, the radiation energy stored on the portion of the stimulable phosphor sheet where the amount of exposure to the radiation is comparatively low becomes markedly low. The amount of light emitted by such a portion of the stimulable phosphor sheet naturally becomes of a markedly low level. In the aforesaid radiation image recording and reproducing system, even light of such a low level can be read out. However, the level of a noise component becomes comparatively high in the image signal obtained by detecting the light of such a low level, and graininess at the portion represented by the image signal is deteriorated in the reproduced visible image.

The problem of deterioration of graininess may be solved by processing the image signal, for example, by passing the image signal through a low-pass filter and eliminating the noise component in the high-frequency region. However, with this method, also the high-frequency component of the image signal representing the detail component of the image is decreased over the overall region, and sharpness of the reproduced visible image becomes low also at the image portion where the amount of exposure to the radiation is comparatively high. In general, the image portion where the amount of exposure to the radiation is comparatively high is the portion at which the detail component is to be observed in detail. Therefore, the reproduced visible image having sharpness deteriorated at said portion becomes unsuitable for viewing, particularly for diagnostic purposes.

SUMMARY OF THE INVENTION

The primary object of the present invention is to provide a method of minimizing image signal noise, which reliably eliminates a noise component of an image signal without deteriorating image sharpness at a portion where a detail component is to be observed in detail.

Another object of the present invention is to provide an apparatus for carrying out the method of minimizing image signal noise.

A further object of the present invention is to provide a radiation image read-out method which prevents deterioration in graininess of a reproduced visible image.

The specific object of the present invention is to provide an apparatus for carrying out the radiation image read-out method.

The present invention provides a method of minimizing image signal noise, which comprises the steps of:

(i) feeding an image signal representing an image to a high-frequency component decreasing means capable of arbitrarily decreasing a high-frequency component, (ii) detecting the level of said image signal, and (iii) decreasing the high-frequency component of said image signal by said high-frequency component decreasing means in accordance with a decrease in said level of said image signal.

The method of minimizing image signal noise in accordance with the present invention is carried out by an apparatus comprising:

(i) a high-frequency component decreasing means constituted for arbitrarily decreasing a high-frequency component of an input signal and fed with an image signal representing an image, and (ii) a control means for receiving said image signal to detect the level of said image signal, and operating said high-frequency component decreasing means in accordance with a decrease in said level of said image signal to decrease the high-frequency component of said image signal.

The present invention also provides a radiation image read-out method for exposing a stimulable phosphor sheet carrying a radiation image stored thereon to stimulating rays which cause the stimulable phosphor sheet to emit light in proportion to the stored radiation energy, and photoelectrically detecting the light emitted by the portion of the stimulable phosphor sheet exposed to the stimulating rays by use of a photodetector to obtain an image signal representing the radiation image, wherein the improvement comprises the steps of:

(i) feeding said image signal to a high-frequency component decreasing means capable of arbitrarily decreasing a high-frequency component, (ii) detecting the level of radiation energy stored on said stimulable phosphor sheet, and (iii) decreasing the high-frequency component of said image signal by said high-frequency component decreasing means in accordance with a decrease in said level of the stored radiation energy.

The present invention also provides a radiation image read-out apparatus including a means for emitting stimulating rays to a stimulable phosphor sheet carrying a radiation image stored thereon, a means for moving said stimulable phosphor sheet, and a photodetector for detecting light emitted by said stimulable phosphor sheet in proportion to the stored radiation energy upon exposure to stimulating rays and obtaining an image signal representing said radiation image, wherein the improvement comprises the provision of:

(i) a high-frequency component decreasing means constituted for arbitrarily decreasing a high-frequency component of an input signal and fed with said image signal, (ii) a means for detecting the level of radiation energy stored on said stimulable phosphor sheet, and (iii) a control means for receiving the information on said level of radiation energy stored on said stimulable phosphor sheet, and operating said high-frequency component decreasing means in accordance with a decrease in said level of the stored radiation energy to decrease the high-frequency component of said image signal.

With the method of and apparatus for minimizing image signal noise in accordance with the present invention, the high-frequency component of the image signal is decreased in accordance with a decrease in the level of the image signal, so that a noise component of a comparatively high level with respect to the signal component is eliminated reliably. On the other hand, processing for decreasing the high-frequency component is not conducted or only slightly effected for the image signal in the high level region. Therefore, sharpness at a portion which the image signal in the high level region represents is not deteriorated in the reproduced visible image, and the detail component which is to be observed in detail is maintained in the reproduced visible image. Accordingly, it is possible to obtain a visible image having a high image quality. Particularly, when the method of and apparatus for minimizing image signal noise in accordance with the present invention are applied to the aforesaid radiation image recording and reproducing system, it becomes possible to reproduce a visible radiation image suitable for viewing, particularly for diagnostic purposes.

With the radiation image read-out method and apparatus in accordance with the present invention, when the high-frequency component of the image signal is decreased, sharpness of the visible image reproduced by use of the image signal deteriorates. Graininess of an image generally deteriorates as image sharpness is improved. Therefore, when sharpness is made low, it is possible to prevent graininess of the reproduced visible image from deteriorating. Since a visible image of good graininess can be obtained also from a stimulable phosphor sheet carrying a radiation image stored thereon by adjusting the radiation dose to be low, it becomes possible to always obtain a visible radiation image having an improved image quality, particularly a high diagnostic efficiency and accuracy, by adjusting the radiation dose to a desired level in the radiation image recording step.

DESCRIPTION OF THE PREFERRED EMBODIMENTS

The present invention will hereinbelow be described in further detail with reference to the accompanying drawings.

Figure 1:
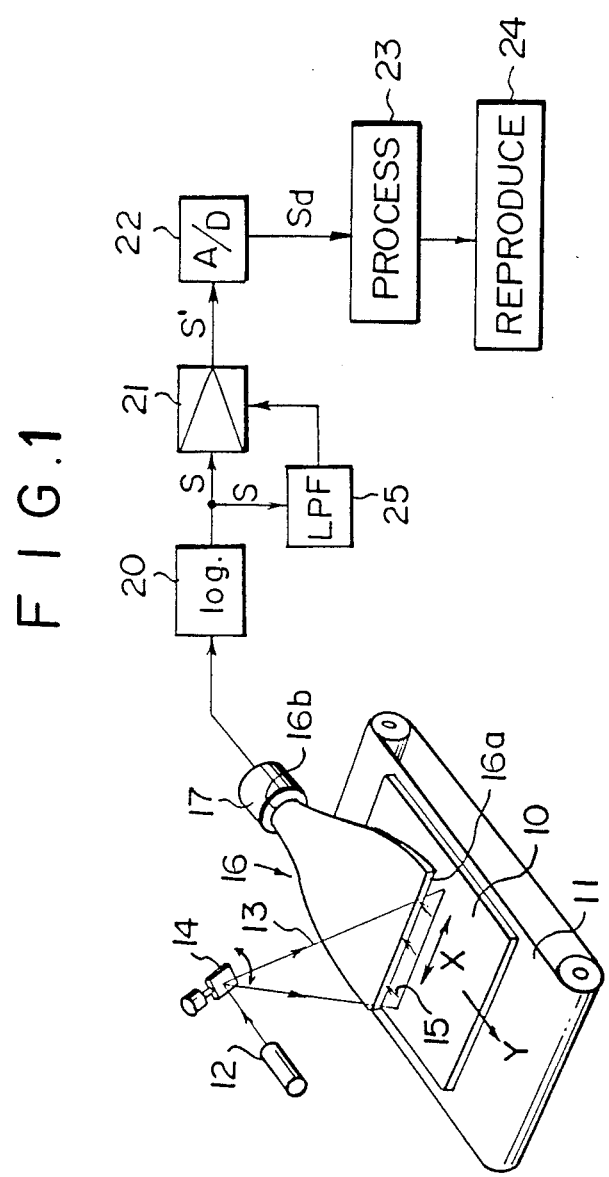
FIG. 1 is a schematic view showing the radiation image read-out apparatus wherein an embodiment of the apparatus for minimizing image signal noise in accordance with the present invention is employed.

FIG. 1 shows an embodiment of the apparatus for minimizing image signal noise, which is combined, by way of example, with an apparatus for reading out a radiation image from a stimulable phosphor sheet carrying the radiation image stored thereon. The radiation image read-out apparatus will first be described hereinbelow. A stimulable phosphor sheet 10 carrying a radiation image of an object stored thereon by being exposed to a radiation such as X-rays passing through the object is conveyed by a sheet conveyance means 11 comprising an endless belt or the like in a sub-scanning direction as indicated by the arrow Y. A laser beam 13 emitted as stimulating rays by a laser beam source 12 is deflected by a light deflector 14 constituted by a galvanometer mirror or the like, and scans the stimulable phosphor sheet 10 in a main scanning direction as indicated by the arrow X approximately normal to the sub-scanning direction as indicated by the arrow Y. When the stimulable phosphor sheet 10 is exposed to the laser beam 13, the exposed portion of the sheet 10 emits light 15 in an amount proportional to the stored radiation energy. The emitted light 15 is guided by a light guide member 16 and is photoelectrically detected by a photomultiplier 17 acting as a photodetector.

The light guide member 16 is made by forming a light guiding material such as an acrylic plate, and has a linear light input face 16a positioned to extend along the beam scanning line on the stimulable phosphor sheet 10, and a ring-shaped light output face 16b closely contacted with a light receiving face of the photomultiplier 17. The emitted light 15 entering the light guide member 16 from its light input face 16a is guided through total reflection inside of the light guide member 16, emanates from the light output face 16b, and is received by the photomultiplier 17. In this manner, the amount of the emitted light 15 carrying the radiation image information is detected by the photomultiplier 17.

An analog output signal generated by the photomultiplier 17 is logarithmically converted by a logarithmic converter 20 into a read-out image signal S representing the amount of the emitted light 15, i.e. the radiation image, which is fed to a variable frequency response amplifier 21 and a low-pass filter 25. The read-out image signal S is amplified by the variable frequency response amplifier 21 into a read-out image signal S', which is then digitized by an A/D converter 22. A digital read-out image signal Sd thus obtained is sent to an image reproducing apparatus 24 such as a CRT or a light beam scanning recording apparatus via an image processing device 23, and the radiation image which was stored on the stimulable phosphor sheet 10 is reproduced as a visible image by the image reproducing apparatus 24.

Figure 2:
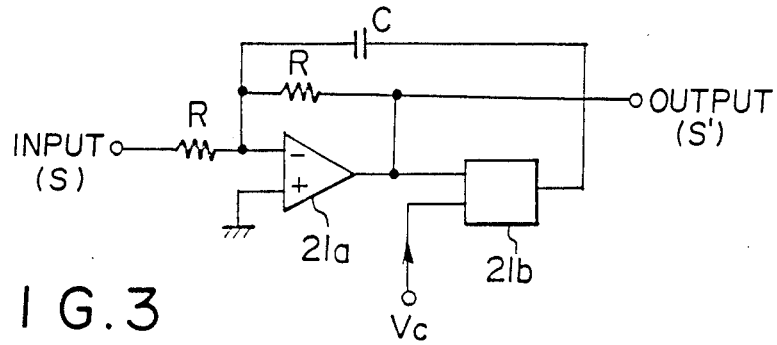
FIG. 2 is a circuit diagram showing a part of the electric circuit in the embodiment of FIG. 1.
Figure 3:
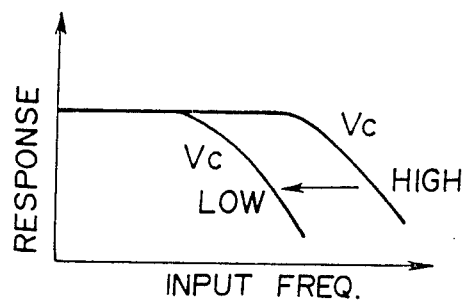
FIG. 3 is a graph showing the characteristics of the embodiment of FIG. 1.
Figure 4:
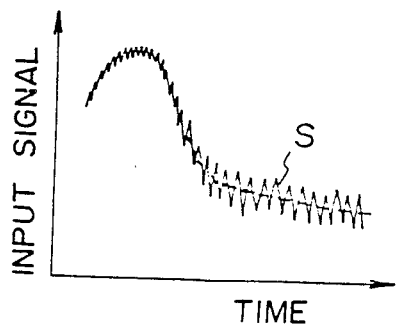
FIG. 4 is a graph showing an example of the image signal.
Figure 5:
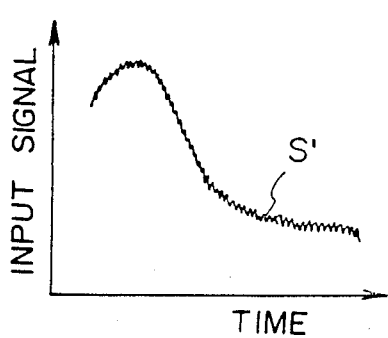
FIG. 5 is a graph showing an example of the image signal processed for minimizing noise in accordance with the present invention.

The variable frequency response amplifier 21 has a configuration as shown in FIG. 2. The read-out image signal S fed to an operational amplifier 21a of the variable frequency response amplifier 21 is amplified with the characteristics as shown in FIG. 3 into the read-out image signal S' in accordance with the level of a control voltage Vc fed to a multiplier 21b acting as a control means. The multiplier 21b is connected with the low-pass filter 25, and the output of the 25 is fed as the control voltage Vc to the multiplier 21b. As mentioned above, the signal fed to the low-pass filter 25 is the read-out image signal S. For example, the read-out image signal S has the waveform as shown in FIG. 4, and contains a large high-frequency noise component in the low level region corresponding to very weak light emitted by the stimulable phosphor sheet. When the read-out image signal S is passed through the low-pass filter 25, the low-frequency component (i.e. the component indicated by the broken line in FIG. 4) representing the basic level of the read-out image signal S is extracted and fed as the control voltage Vc to the multiplier 21b. Therefore, as is clear from the characteristics shown in FIG. 3, the read-out image signal S fed to the variable frequency response amplifier 21 is processed thereby so that the high-frequency component is decreased as the level of the read-out image signal S becomes low. Specifically, the signal S' obtained by passing the read-out image signal S as shown in FIG. 4 through the variable frequency response amplifier 21 becomes as shown in FIG. 5. As the control voltage Vc of the variable frequency response amplifier 21, the read-out image signal S may be directly fed to the variable frequency response amplifier 21 without passage through the low-pass filter 25.

When the high-frequency component of the read-out image signal S is decreased as mentioned above, the high-frequency noise component is eliminated. Therefore, a visible radiation image reproduced by the image reproducing apparatus 24 based on the read-out image signal S' exhibits good graininess and is suitable for viewing, particularly for diagnostic purposes. When the read-out image signal S is processed in this manner, sharpness at the image portion represented by the read-out image signal S in the low level region becomes low. However, no problem arises with viewing, particularly for diagnosis, since said image portion is the region where the amount of exposure to the radiation is low, the sharpness is naturally low, and the detail component need not be observed. Also, since the extent of processing for decreasing the high-frequency component is gradually decreased as the level of the read-out image signal S increases, sharpness at the image portion which the read-out image signal S in the high level region represents does not deteriorate or deteriorates only slightly, and sharpness at the image portion where the amount of exposure to the radiation is high and the detail component is to be observed is maintained high.

Figure 6:
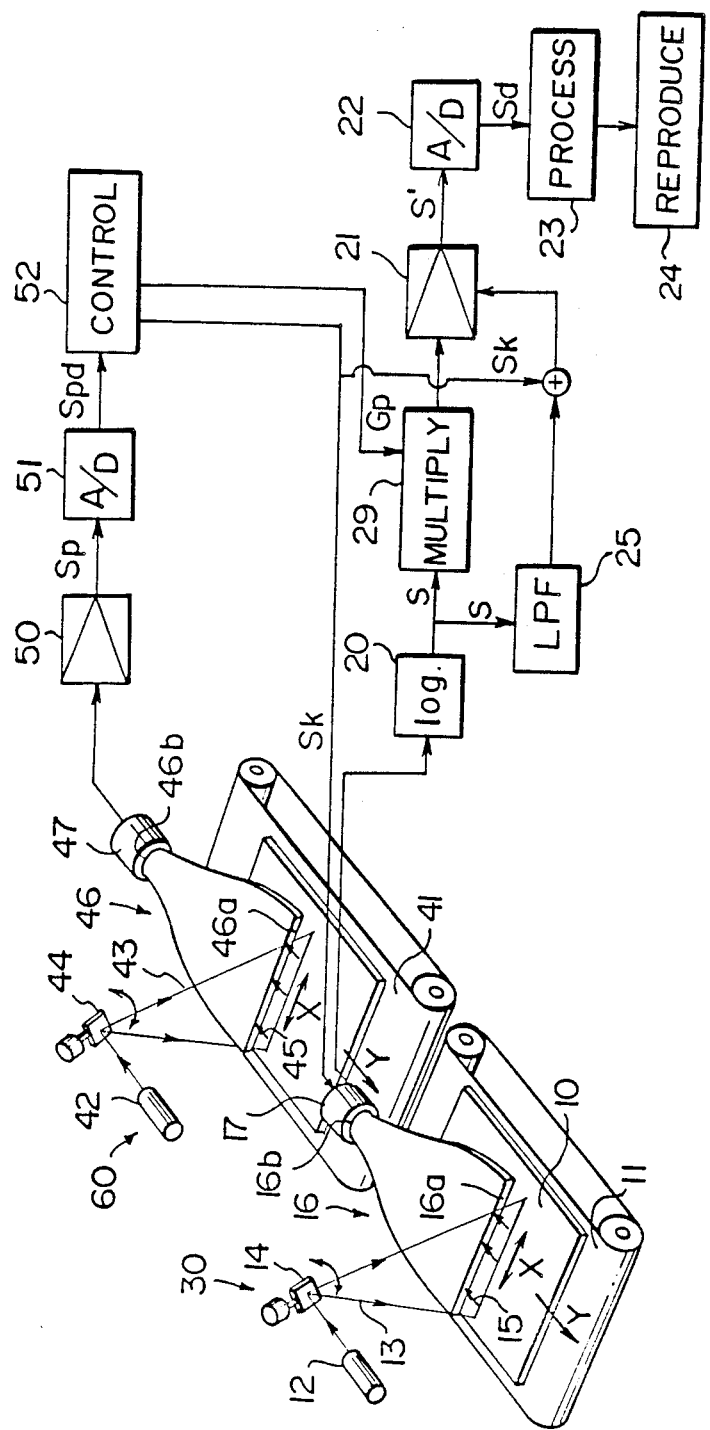
FIG. 6 is a schematic view showing the radiation image read-out apparatus wherein another embodiment of the apparatus for minimizing image signal noise in accordance with the present invention is employed.

Another embodiment of the method of minimizing image signal noise in accordance with the present invention will hereinbelow be described with reference to FIG. 6. In FIG. 6, similar elements are numbered with the same reference numerals with respect to FIG. 1. This embodiment is applied to a radiation image read-out apparatus wherein preliminary read-out is conducted for approximately ascertaining the radiation image stored on the stimulable phosphor sheet 10 and then final read-out for obtaining an image signal for use in reproduction of a visible image for viewing, particularly for diagnostic purposes, is carried out based on the information obtained by the preliminary read-out. The radiation image read-out apparatus is provided with a final read-out section 30 comprising the sheet conveyance means 11, the laser beam source 12, the light deflector 14, the light guide member 16 and the photomultiplier 17 as in the apparatus of FIG. 1. The radiation image read-out apparatus is also provided with a preliminary read-out section 60 comprising a sheet conveyance means 41, a laser beam source 42 for emitting a laser beam 43, a light deflector 44, a light guide member 46 for guiding light 45 emitted by the stimulable phosphor sheet 10, and a photomultiplier 47. The stimulable phosphor sheet 10 carrying a radiation image stored thereon is first subjected to the preliminary read-out carried out for approximately ascertaining the image input information on the sheet 10 at the preliminary read-out section 60 before the final read-out is carried out at the final read-out section 30 for obtaining an image signal for use in reproduction of a visible image for viewing, particularly for diagnostic purposes. In the preliminary read-out, the stimulation energy of the stimulating rays, i.e. the laser beam 43, is adjusted to be lower than the stimulation energy of the stimulating rays, i.e. the laser beam 13, used in the final read-out. The output of the photomultiplier 47 obtained by the preliminary read-out is amplified with a fixed read-out gain by a preliminary read-out logarithmic amplifier 50 into a preliminary read-out image signal Sp, which is then digitized by a preliminary read-out A/D converter 51 with a fixed scale factor (latitude). The digital preliminary read-out image signal Spd thus obtained is fed to a final read-out control circuit 52. Based on the preliminary read-out image signal Spd approximately representing the radiation image stored on the stimulable phosphor sheet 10, the final read-out control circuit 52 outputs setting values Sk and Gp respectively representing the optimal read-out gain and the optimal scale factor.

After the preliminary read-out is finished, the stimulable phosphor sheet 10 is sent to the final read-out section 30 and subjected to the final read-out. In the final read-out step, image read-out conditions are adjusted to optimal values based on the information obtained by the preliminary read-out. Specifically, the setting value Sk corresponds to the amount of radiation to which the stimulable phosphor sheet 10 was actually exposed, and the read-out gain in the final read-out is adjusted to an optimal value by changing the high voltage applied to the final read-out photomultiplier 17 in accordance with the setting value Sk. Also, a multiplier 29 is disposed between the logarithmic converter 20 and the variable frequency response amplifier 21, and the multiplication factor of the multiplier 29 is changed in accordance with the setting value Gp, so that the scale factor (latitude) in the course of digitization by the A/D converter 22 is adjusted to an optimal value.

With the aforesaid configuration, the high voltage applied to the final read-out photomultiplier 17 is changed in accordance with the amount of exposure of the stimulable phosphor sheet 10 to the radiation, and therefore the output of the photomultiplier 17 does not necessarily coincide with the amount of exposure of the sheet 10 to the radiation. Therefore, in this embodiment, the aforesaid setting value Sk is added to the read-out image signal S generated by the logarithmic converter 20 and passed through the low-pass filter 25, and the sum signal obtained by the addition is fed to the control voltage Vc to the amplifier 21b of the variable frequency response amplifier 21. As a result, the read-out image signal S fed to the variable frequency response amplifier 21 is processed so that the high-frequency component is decreased as the amount of exposure of the stimulable phosphor sheet 10 to the radiation decreases (of course, as the level of the read-out image signal S becomes low). Accordingly, it is possible to obtain the effects of improving the graininess of the reproduced visible image and maintaining the sharpness at the region where the amount of exposure of the stimulable phosphor sheet 10 to the radiation is high, as in the embodiment of FIG. 1.

In the aforesaid two embodiments, the variable frequency response amplifier 21 is used as the high-frequency component decreasing means, and the range of decrease in the high-frequency component of the read-out image signal S fed to the variable frequency response amplifier 21 is changed continuously in accordance with the level of the read-out image signal S. However, the range of decrease in the high-frequency component of the read-out image signal S may be fixed. Specifically, instead of the variable frequency response amplifier 21, a low-pass filter exhibiting fixed characteristics and a by-pass circuit for the low-pass filter may be used as the high-frequency component decreasing means, and the read-out image signal S may be passed through the low-pass filter only when the level of the read-out image signal S is lower than a predetermined value.

The aforesaid embodiments are constituted for eliminating the noise component of the read-out image signal S in the apparatus for reading out the radiation image from the stimulable phosphor sheet 10. However, the method of minimizing image signal noise in accordance with the present invention is also applicable to elimination of high-frequency noise components contained in any other image signals besides the radiation image read-out signal.

Figure 7:
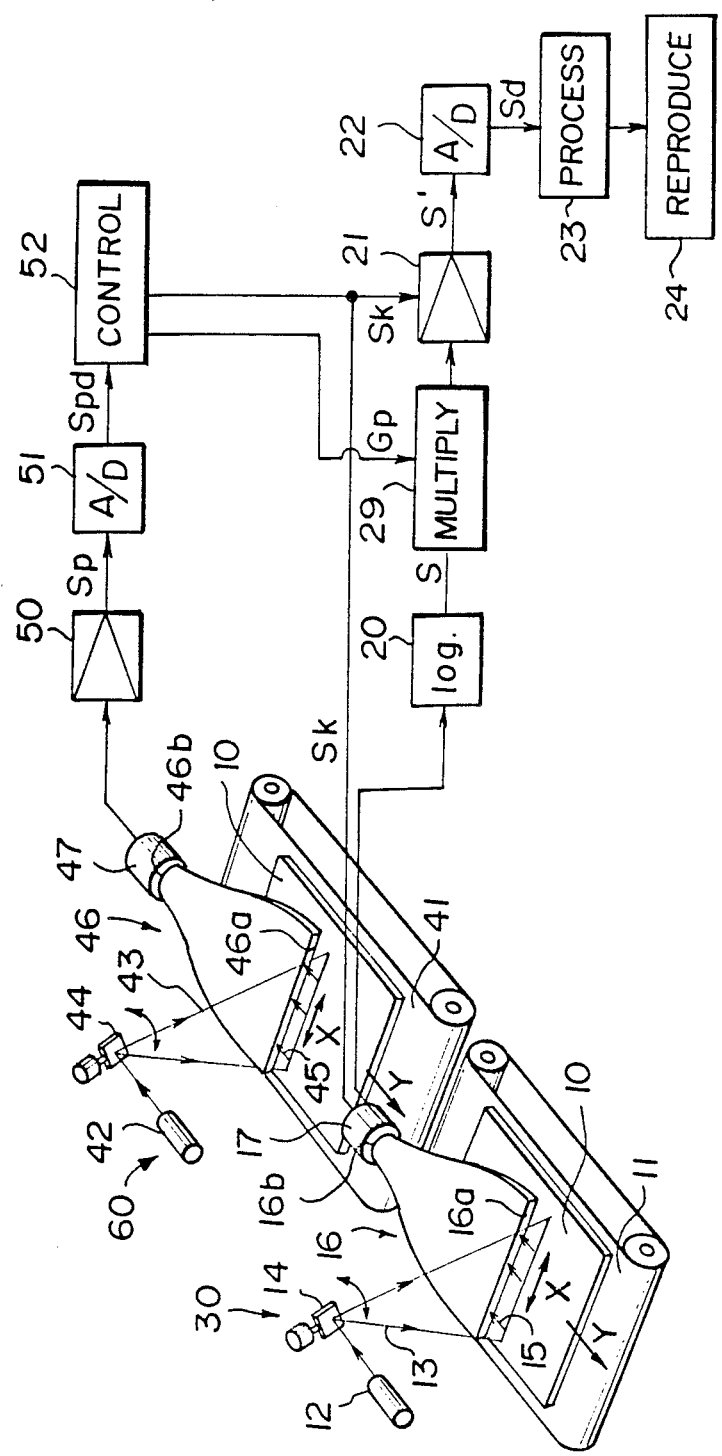
FIG. 7 is a schematic view showing the radiation image read-out apparatus wherein an embodiment of the radiation image read-out method in accordance with the present invention is employed.
Figure 8:
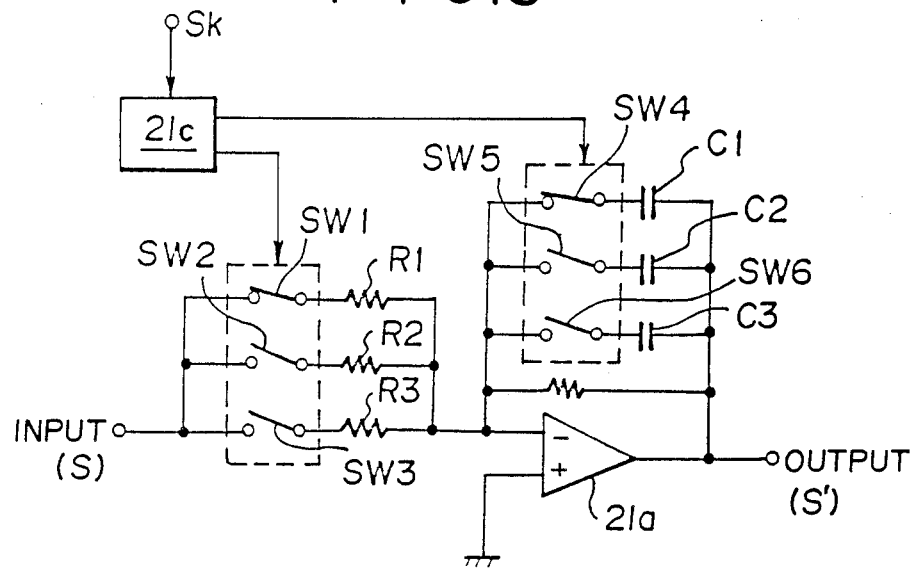
FIG. 8 is a circuit diagram showing a part of the radiation image read-out apparatus of FIG. 7.
Figure 9:
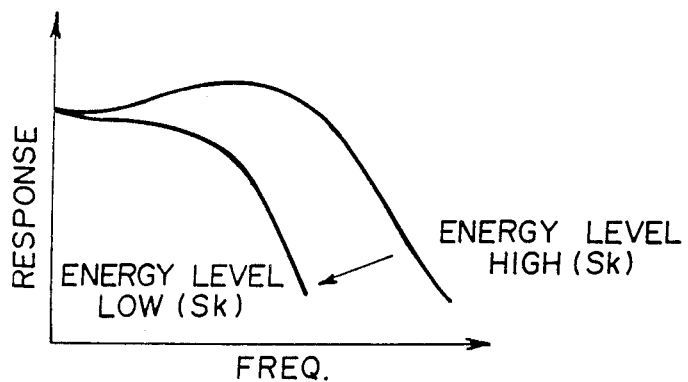
FIG. 9 is a graph showing the characteristics of the high-frequency component decreasing means in the radiation image read-out apparatus of FIG. 7.

FIG. 7 shows a radiation image read-out apparatus for carrying out an embodiment of the radiation image read-out method in accordance with the present invention. In FIG. 7, similar elements are numbered with the same reference numerals with respect to FIG. 6. In this embodiment, the variable frequency response amplifier 21 has a configuration as shown in FIG. 8. The read-out image signal S fed to the operational amplifier 21a of the variable frequency response amplifier 21 is amplified with the characteristics as shown in FIG. 9 into a read-out image signal S'. Specifically, the frequency response of the variable frequency response amplifier 21 can be changed in nine steps by selecting one of resistors R1, R2 and R3 having different resistance values by switches SW1, SW2 and SW3, and selecting one of capacitors C1, C2 and C3 having different capacitances as a circuit element by switches SW4, SW5 and SW6. Change-over the switches SW1 through SW6 is controlled by a characteristic control device 21c which receives the setting value Sk corresponding to the radiation energy stored on the stimulable phosphor sheet 10.

The control device 21c controls change-over of the switches SW1 through SW6, i.e. the frequency response of the variable frequency response amplifier 21, so that the high-frequency component of the read-out image signal S is more decreased as the level of the radiation energy stored on the stimulable phosphor sheet 10 and represented by the setting value Sk becomes lower.

When the high-frequency component of the read-out image signal S is decreased in this manner, the visible radiation image reproduced by the image reproducing apparatus 24 based on the read-out image signal S' (Sd) becomes such that sharpness in the main scanning direction decreases and deterioration in graininess is prevented thereby, and therefore becomes suitable for viewing, particularly for diagnostic purposes.

In the embodiment of FIG. 7, the frequency response of the variable frequency response amplifier 21 is changed stepwise. However, the frequency response of the variable frequency response amplifier 21 may also be changed continuously in accordance with the level of the radiation energy stored on the stimulable phosphor sheet 10. Also, instead of the variable frequency response amplifier 21, a low-pass filter exhibiting fixed characteristics and a by-pass circuit for the low-pass filter may be used as the high-frequency component decreasing means, and the read-out image signal S may be passed through the low-pass filter only when the level of the radiation energy stored on the stimulable phosphor sheet 10 is lower than a predetermined value.

Also, in the embodiment of FIG. 7, the processing for decreasing the high-frequency component of the read-out image signal S may be carried out in any step prior to reproduction of the visible image and may, for example, be conducted on the image signal converted into an analog signal for modulation of the recording light beam in the image reproducing apparatus 24.

The level of the radiation energy stored on the stimulable phosphor sheet 10 may also be determined by a method other than the preliminary read-out. For example, since the radiation dose in the image recording step which fixes the level of the stored radiation energy is predetermined approximately constant in accordance with the image recording conditions such as the image recording portion of the object and the image recording method, the level of the stored radiation energy may be determined based on the information on the image recording conditions. Or, the level of the stored radiation energy may be determined by obtaining a signal corresponding to the radiation dose setting value from a photo-timer or the like for adjusting the radiation dose in the image recording step to a predetermined value.

We claim:

1. A method of minimizing image signal noise, which comprises the steps of:
   (i) feeding an image signal representing an image to a high-frequency component decreasing means capable of arbitrarily decreasing a high-frequency component,
   (ii) detecting the level of said image signal, and
   (iii) decreasing the high-frequency component of said image signal by said high-frequency component decreasing means in accordance with a decrease in said level of said image signal.

2. A method as defined in claim 1 wherein said image signal is a radiation image signal read out from a stimulable phosphor sheet carrying a radiation image stored thereon.

3. An apparatus for minimizing image signal noise, which comprises:
   (i) a high-frequency component decreasing means constituted for arbitrarily decreasing a high-frequency component of an input signal and fed with an image signal representing an image, and
   (ii) a control means for receiving said image signal to detect the level of said image signal, and operating said high-frequency component decreasing means in accordance with a decrease in said level of said image signal to decrease the high-frequency component of said image signal.

4. An apparatus as defined in claim 3 wherein said high-frequency component decreasing means comprises a variable frequency response amplifier.

5. An apparatus as defined in claim 3 wherein said control means comprises a multiplier for receiving the output of a low-pass filter through which said image signal is passed.

6. An apparatus as defined in claim 3 wherein said control means comprises a multiplier for receiving a sum signal obtained by adding a value for setting a read-out gain used in the course of reading out said image to the output of a low-pass filter through which said image signal is passed.

7. An apparatus as defined in claim 3 wherein said image signal is a radiation image signal read out from a stimulable phosphor sheet carrying a radiation image stored thereon.

8. A radiation image read-out method for exposing a stimulable phosphor sheet carrying a radiation image stored thereon to stimulating rays which cause the stimulable phosphor sheet to emit light in proportion to the stored radiation energy, and photoelectrically detecting the light emitted by the portion of the stimulable phosphor sheet exposed to the stimulating rays by use of a photodetector to obtain an image signal representing the radiation image,
   wherein the improvement comprises the steps of:
   (i) feeding said image signal to a high-frequency component decreasing means capable of arbitrarily decreasing a high-frequency component,
   (ii) detecting the level of radiation energy stored on said stimulable phosphor sheet, and
   (iii) decreasing the high-frequency component of said image signal by said high-frequency component decreasing means in accordance with a decrease in said level of the stored radiation energy.

9. A method as defined in claim 8 wherein said level of radiation energy stored on said stimulable phosphor sheet is detected by preliminary read-out which is carried out for approximately ascertaining the image input information on said stimulable phosphor sheet by exposing said stimulable phosphor sheet to the stimulating rays of a level lower than the level of the stimulating rays used in final read-out before said final read-out is carried out for obtaining said image signal.

10. A radiation image read-out apparatus including a means for emitting stimulating rays to a stimulable phosphor sheet carrying a radiation image stored thereon, a means for moving said stimulable phosphor sheet, and a photodetector for detecting light emitted by said stimulable phosphor sheet in proportion to the stored radiation energy upon exposure to stimulating rays and obtaining an image signal representing said radiation image,
    wherein the improvement comprises the provision of:
    (i) a high-frequency component decreasing means constituted for arbitrarily decreasing a high-frequency component of an input signal and fed with said image signal,
    (ii) a means for detecting the level of radiation energy stored on said stimulable phosphor sheet, and
    (iii) a control means for receiving the information on said level of radiation energy stored on said stimulable phosphor sheet, and operating said high-frequency component decreasing means in accordance with a decrease in said level of the stored radiation energy to decrease the high-frequency component of said image signal.

11. An apparatus as defined in claim 10 wherein said high-frequency component decreasing means comprises a variable frequency response amplifier constituted by an operational amplifier, a plurality of switches for selecting one of resistors having different resistance values, and a plurality of switches for selecting one of capacitors having different capacitances.

12. An apparatus as defined in claim 11 wherein said control means controls change-over of said switches for the resistors and said switches for the capacitors, thereby to control the frequency response of said variable frequency response amplifier.

13. An apparatus as defined in claim 10 wherein said apparatus includes a final read-out system and a preliminary read-out system respectively comprising said means for emitting stimulating rays, said means for moving said stimulable phosphor sheet, and said photodetector, the level of the stimulating rays in said preliminary read-out system being lower than the level of the stimulating rays in said final read-out, and said means for detecting the level of radiation energy stored on said stimulable phosphor sheet detects said level of the stored radiation energy on the basis of information obtained by preliminary read-out carried out by said preliminary read-out system.

* * * * *